United States Patent
Zhang et al.

(10) Patent No.: US 12,310,270 B2
(45) Date of Patent: May 27, 2025

(54) IMPLEMENT DESCENDING STABILITY CONTROL METHOD AND SYSTEM AND TRACTOR

(71) Applicants: JiangSu XCMG Construction Machinery Research Institute LTD., Jiangsu (CN); Xuzhou XCMG Agricultural Equipment Technology Co., Ltd, Jiangsu (CN)

(72) Inventors: Xiao Zhang, Jiangsu (CN); Luyun Zhang, Jiangsu (CN); Hongbo Zhang, Jiangsu (CN); Haoliang Qin, Jiangsu (CN)

(73) Assignees: JiangSu XCMG Construction Machinery Research Institute LTD., Jiangsu (CN); Xuzhou XCMG Agricultural Equipment Technology Co., Ltd, Jiangsu (CN)

( * ) Notice: Subject to any disclaimer, the term of this patent is extended or adjusted under 35 U.S.C. 154(b) by 0 days.

(21) Appl. No.: 18/578,719

(22) PCT Filed: Oct. 13, 2021

(86) PCT No.: PCT/CN2021/123385
§ 371 (c)(1),
(2) Date: Jan. 12, 2024

(87) PCT Pub. No.: WO2023/004999
PCT Pub. Date: Feb. 2, 2023

(65) Prior Publication Data
US 2024/0315155 A1    Sep. 26, 2024

(30) Foreign Application Priority Data
Jul. 27, 2021 (CN) .......................... 202110851992.9

(51) Int. Cl.
*A01B 63/10* (2006.01)
*A01B 63/112* (2006.01)
(Continued)

(52) U.S. Cl.
CPC ........ *A01B 63/1006* (2013.01); *A01B 63/112* (2013.01); *F15B 11/0423* (2013.01);
(Continued)

(58) Field of Classification Search
CPC ... A01B 63/006; A01B 63/112; F15B 11/003; F15B 11/042; F15B 11/0423
See application file for complete search history.

(56) References Cited

U.S. PATENT DOCUMENTS 4,552,238 A    11/1985  Joyce, Jr.
4,979,092 A  * 12/1990  Bergene ............... A01B 63/112
                                                        172/3
(Continued)

FOREIGN PATENT DOCUMENTS

CN    205136195    4/2016
CN    107934807    4/2018
(Continued)

OTHER PUBLICATIONS

"International Search Report (Form PCT/ISA/210) of PCT/CN2021/123385", mailed on Apr. 14, 2022, with English translation thereof, pp. 1-5.

*Primary Examiner* — Michael Leslie
(74) *Attorney, Agent, or Firm* — JCIPRNET

(57) ABSTRACT

Disclosed are an implement descending stability control method and system and a tractor. An outlet of a main pump is communicated with an inlet of a main overflow valve, an inlet of a constant-difference overflow valve and an inlet of an implement control valve. An oil outlet of the implement control valve is connected with a spring cavity of the (Continued)

constant-difference overflow valve through a steady-state throttle valve and is communicated with an inlet of a switching valve. An oil outlet of the switching valve is connected with a rodless cavity of a suspension cylinder in a suspension mechanism, and the rodless cavity of the suspension cylinder is communicated with an inlet of a descending valve. A rod cavity of the suspension cylinder is connected with an inlet of a secondary overflow valve.

9 Claims, 2 Drawing Sheets

(51) Int. Cl.
F15B 11/042 (2006.01)
F15B 11/044 (2006.01)
F15B 15/28 (2006.01)
F15B 21/08 (2006.01)

(52) U.S. Cl.
CPC ........ *F15B 11/044* (2013.01); *F15B 15/2815* (2013.01); *F15B 21/082* (2013.01); *F15B 21/087* (2013.01)

(56) References Cited

U.S. PATENT DOCUMENTS

| | | | | |
|---|---|---|---|---|
| 5,163,353 | A | * | 11/1992 | Horstmann ........... F15B 11/064 91/468 |
| 5,469,703 | A | * | 11/1995 | Ericsson ................. F15B 20/00 60/452 |
| 7,175,155 | B2 | * | 2/2007 | Takiguchi ............. F15B 11/003 251/29 |
| 8,033,209 | B2 | * | 10/2011 | Jessen ................... F15B 11/028 701/50 |
| 8,925,439 | B2 | * | 1/2015 | Greenwood ....... A01B 63/1006 91/445 |
| 9,505,288 | B2 | * | 11/2016 | Bauer .................... B60G 17/08 |

FOREIGN PATENT DOCUMENTS

| | | |
|---|---|---|
| CN | 207830251 | 9/2018 |
| CN | 109854554 | 6/2019 |
| DE | 102013206973 | 10/2014 |
| JP | 2005104513 | 4/2005 |
| JP | 2006284907 | 10/2006 |

\* cited by examiner

IMPLEMENT DESCENDING STABILITY CONTROL METHOD AND SYSTEM AND TRACTOR

CROSS-REFERENCE TO RELATED APPLICATION

This application is a 371 of international application of PCT application serial no. PCT/CN2021/123385, filed on Oct. 13, 2021, which claims the priority benefit of China application no. 202110851992.9, filed on Jul. 27, 2021. The entirety of each of the above mentioned patent applications is hereby incorporated by reference herein and made a part of this specification.

TECHNICAL FIELD

The invention belongs to the technical field of tractors, and particularly relates to an implement descending stability control method and system and a tractor.

DESCRIPTION OF RELATED ART

In actual work of tractors, the tractors are often used together with different implements to realize different field operations, and implement control is realized by means of a lifting system of the tractors. Common tractors are standard equipped with a rear lifting system, and high-end tractors are equipped with a front lifting system. The lifting systems, including mechanical lifting systems and electro-hydraulic lifting systems, are mainly used for realizing ascending, descending, floating, stopping and other functions of implements. In field operations, tilling depth control or floating control needs to be carried out, wherein ascending/descending control of implements is needed at the end of fields and is performed frequently. Because the implements are heavy, the impact problem is easily caused in the ascending or descending process of implements. Especially at the start of descending, due to the large load, the impact problem will be caused if a valve is opened quickly. Meanwhile, with the increase of the torque of implements, the descending speed of the implements will be increased, and the implements may be damaged if they reach the ground at a high speed.

BRIEF SUMMARY OF THE INVENTION

To overcome the defects of the prior art, the invention provides an implement descending stability control method and system and a tractor, which can determine the descending mode of an implement according to load information of the implement and have the characteristics of good inching performance, smooth starting, controllable descending speed and stable descending.

To fulfill the above purpose, the technical solution adopted by the invention is as follows:

In a first aspect, the invention provides an implement descending stability control system, comprising a main pump, wherein an outlet of the main pump is communicated with an inlet of a main overflow valve, an inlet of a constant-difference overflow valve and an inlet of an implement control valve; an oil outlet of the implement control valve is connected with a spring cavity of the constant-difference overflow valve through a steady-state throttle valve and is communicated with an inlet of a switching valve; an oil outlet of the switching valve is connected with a rodless cavity of a suspension cylinder in a suspension mechanism; the rodless cavity of the suspension cylinder is communicated with an inlet of a descending valve; a rod cavity of the suspension cylinder is connected with an inlet of a secondary overflow valve; a position sensor, a force sensor for acquiring load information of the suspension mechanism, a descending knob, a target position setting knob and a descending speed setting knob are electrically connected with an input terminal of a controller; and an output terminal of the controller is electrically connected with a solenoid valve of the implement control valve, a solenoid valve of the descending valve and a solenoid valve of the switching valve.

Further, the suspension mechanism is a three-point suspension mechanism, and the force sensor is a pin-type tension/pressure sensor at a lower hinge point of a lower link of the three-point suspension mechanism and a tractor body.

Further, the suspension mechanism is a three-point suspension mechanism, and the force sensor is a pressure sensor mounted in the rodless cavity of the suspension cylinder.

Further, the suspension mechanism is a three-point suspension mechanism, and the position sensor is an angle sensor fixed on a lifting shaft.

Further, the suspension mechanism is a three-point suspension mechanism, and the position sensor is a displacement sensor for detecting a piston stroke of the suspension cylinder.

In a second aspect, the invention provides an implement descending stability control method, which uses the implement descending stability control system in the first aspect and comprises: inputting, by a descending knob, a descending instruction to a controller; reading, by the controller, load information of a suspension mechanism acquired by a force sensor and comparing the load information with a set value; when the load information of the suspension mechanism acquired by the force sensor is less than a set value, selecting a no-load or light-load mode by the controller to control an implement to descend; and when the load information of the suspension mechanism acquired by the force sensor is greater than or equal to the set value, selecting a medium-load/heavy-load mode by the controller to control the implement to descend.

Further, when the load information of the suspension mechanism acquired by the force sensor is less than a set value, selecting a no-load or light-load mode by the controller to control an implement to descend specifically comprises: setting an implement control valve as a corresponding control object of a descending speed setting knob, and controlling the implement control valve to obtain a corresponding current Ya according to a set value of the descending speed setting knob and controlling a switching valve to be powered on, by the controller, to allow hydraulic oil output by a main pump to pass through the implement control valve and the switching valve to enter ta rod cavity of a suspension cylinder and hydraulic oil in a rodless cavity of the suspension cylinder to pass through the switching valve to return to an oil tank.

Further, when the load information of the suspension mechanism acquired by the force sensor is greater than or equal to the set value, selecting a medium-load/heavy-load mode by the controller to control the implement to descend specifically comprises: controlling, by the controller, a descending valve to act to allow hydraulic oil in a rodless cavity of a suspension cylinder to pass through the descending valve to return to the oil tank, wherein in this case, a current Yb corresponding to a set value of a descending speed setting knob is a maximum current for controlling the descending valve to move; at the start of descending, performing compensation control in a current increase process to reduce a starting impact, and giving an initial current by:

$$y = kx + e \quad (1)$$

where, y represents a current of the descending valve, k represents a coefficient of variation of current, x represent time, and e represents an initial normal current; when the load information of the suspension mechanism acquired by the force sensor is greater than or equal to the set value, giving a new current by:

$$y_1 = k_1 kx + e \quad (2)$$

where, $y_1$ represents a current obtained after starting compensation, and $k_1$ represents a starting compensation coefficient; different load information corresponds to different compensation coefficients, and the compensation coefficient $k_1$ decreases with the increase of a load.

Further, the controller compares the set value of the descending speed setting knob with a given speed threshold and compares a set value of a target position setting knob with a position threshold to determine a deceleration range in the descending process of an implement; when the implement descends to a designated position based on the determined deceleration range, the descending valve works under the control of the given new current.

In a third aspect, the invention provides a tractor, which is provided with the implement descending stability control system in the first aspect.

Compared with the prior art, the invention fulfills the following beneficial effects:

(1) According to the invention, the force sensor is arranged to acquire load information of the implement, the controller determines the descending mode of the implement according to the load information and works together with the descending valve, the switching valve and the implement control valve to control the implement to descend, and the invention has the characteristics of good inching performance, smooth starting, controllable descending speed and stable descending;

(2) According to the invention, in case of no load or a small load, the set value of the descending speed setting knob is made to correspond to the current of the implement control valve and the constant-difference overflow valve is used to allow oil to enter the rod cavity of the cylinder to obtain a desired descending speed, and the descending speed changes linearly according to the set value of the descending speed setting knob, thus solving the problem of a low descending speed in case of no load or a small load;

(3) According to the invention, in case of a heavy load, compensation is performed at the start of descending to reduce a starting impact, thus solving the problem of starting impact;

(4) According to the invention, in the descending process, an implement is buffered before reaching the target position, such that the implement can be decelerated when approaching the target position and can be stopped when reaching the target position, thus reducing the stopping impact, avoiding damage to the implement and solving the problem of stopping impact;

(5) According to the invention, in the descending process of a plough, compensation control is performed to avoid the acceleration of the plough caused by torque changes and to keep the speed of the plough constant, such that the speed of the plough will not be increased greatly, and the plough can be stopped stably, thus solving the problem that the plough cannot be stopped stably due to the increase of the speed.

DETAILED DESCRIPTION OF THE INVENTION

The invention will be further described below in conjunction with accompanying drawings. The following embodiments are merely used for more clearly explaining the technical solutions of the invention and are not intended to limit the protection scope of the invention.

Embodiment 1

Figure 1:
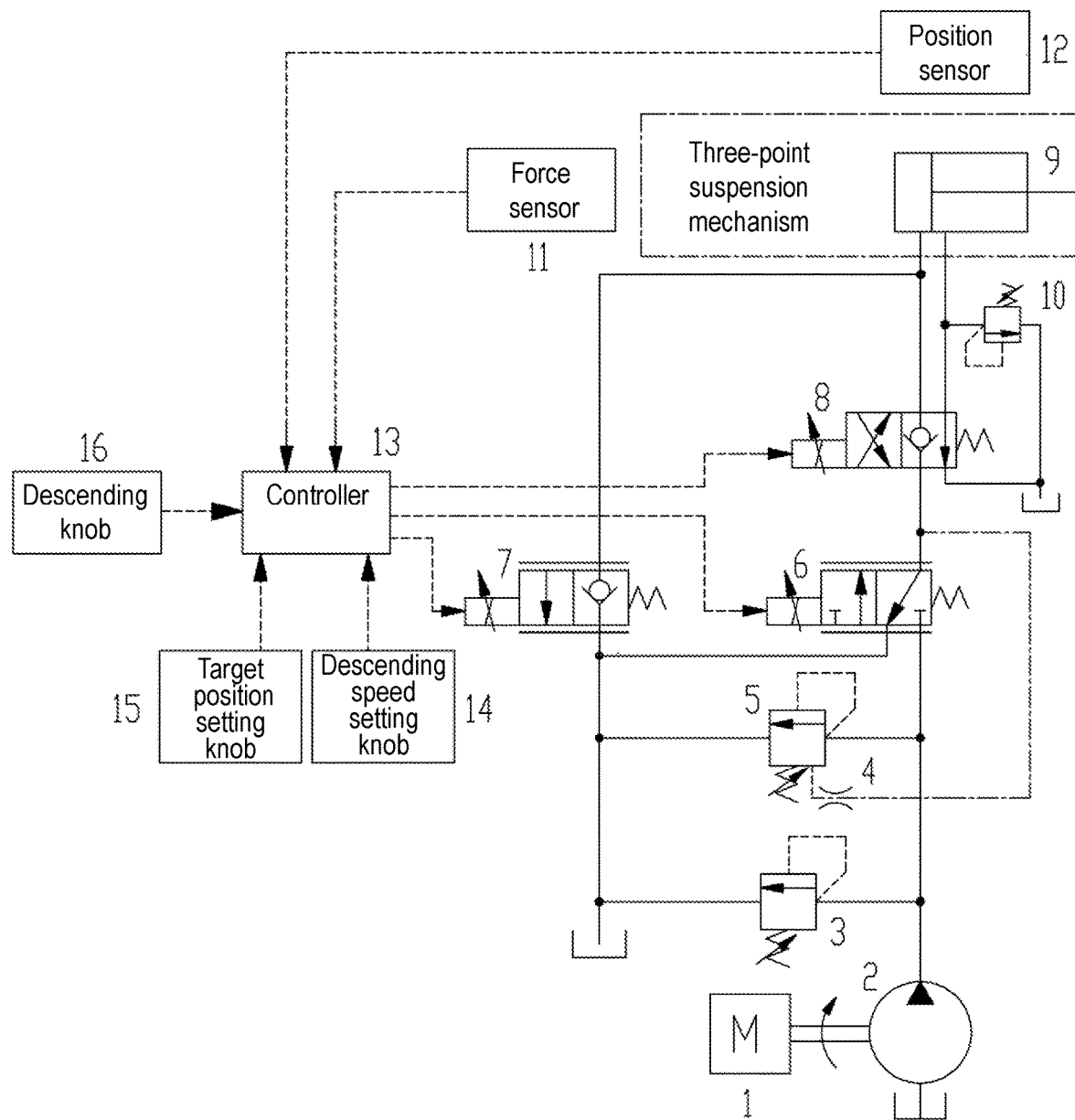
FIG. 1 is a schematic structural diagram of an implement descending stability control system according to an embodiment of the invention.

As shown in FIG. 1, an implement descending stability control system comprises a main pump 2, wherein the main pump 2 is driven by an engine 1, an inlet of the main pump 1 is communicated with an oil tank, an outlet of the main pump 1 is communicated with an inlet of a main overflow valve 3, an inlet of a constant-difference overflow valve 5 and an inlet of an implement control valve 6; an outlet of the main overflow valve 3 and an outlet of the constant-difference overflow valve 5 are communicated with the oil tank; when the implement control valve 6 is in a normal state, an oil return port is communicated with the oil tank; an oil outlet of the implement control valve 6 is connected with a spring cavity of the constant-difference overflow valve 5 through a steady-state throttle valve 4 and is communicated with an inlet of a switching valve 8; an oil outlet of the switching valve 8 is connected with a rodless cavity of a suspension cylinder 9 in a suspension mechanism; the rodless cavity of the suspension cylinder 9 is communicated with an inlet of a descending valve 7; an outlet of the descending valve 7 is communicated with the oil tank; a rod cavity of the suspension cylinder 9 is communicated with an inlet of a secondary overflow valve 10; an outlet of the secondary overflow valve 10 is communicated with the oil tank; a position sensor 12, a force sensor 11 for acquiring load information of the suspension mechanism, a descending knob 16, a target position setting knob 15 and a descending speed setting knob 14 are electrically connected with an input terminal of a controller 13; and an output terminal of the controller 13 is electrically connected with a solenoid valve of the implement control valve 6, a solenoid valve of the descending valve 7 and a solenoid valve of the switching valve 8.

In this embodiment, the suspension mechanism is a three-point suspension mechanism, the force sensor 11 is a pin-type tension/pressure sensor at a lower hinge point of a lower link of the three-point suspension mechanism and a tractor body, or is a pressure sensor mounted in the rodless cavity of the suspension cylinder, or is able to test the change rate of the descending speed in a period of time to determine the load condition. In this embodiment, a position sensor is used to obtain the real-time position of an implement, and the position sensor may be an angle sensor fixed on a lifting shaft or a displacement sensor for detecting the piston stroke of the suspension cylinder to obtain the actual position of the implement.

In this embodiment, the force sensor is arranged to acquire load information of the implement, the controller determines the descending mode of the implement according to the load information and works together with the descending valve, the switching valve and the implement control valve to control the implement to descend, and the implement descending stability control system has the characteristics of good inching performance, smooth starting, controllable descending speed and stable descending.

Embodiment 2

Figure 2:
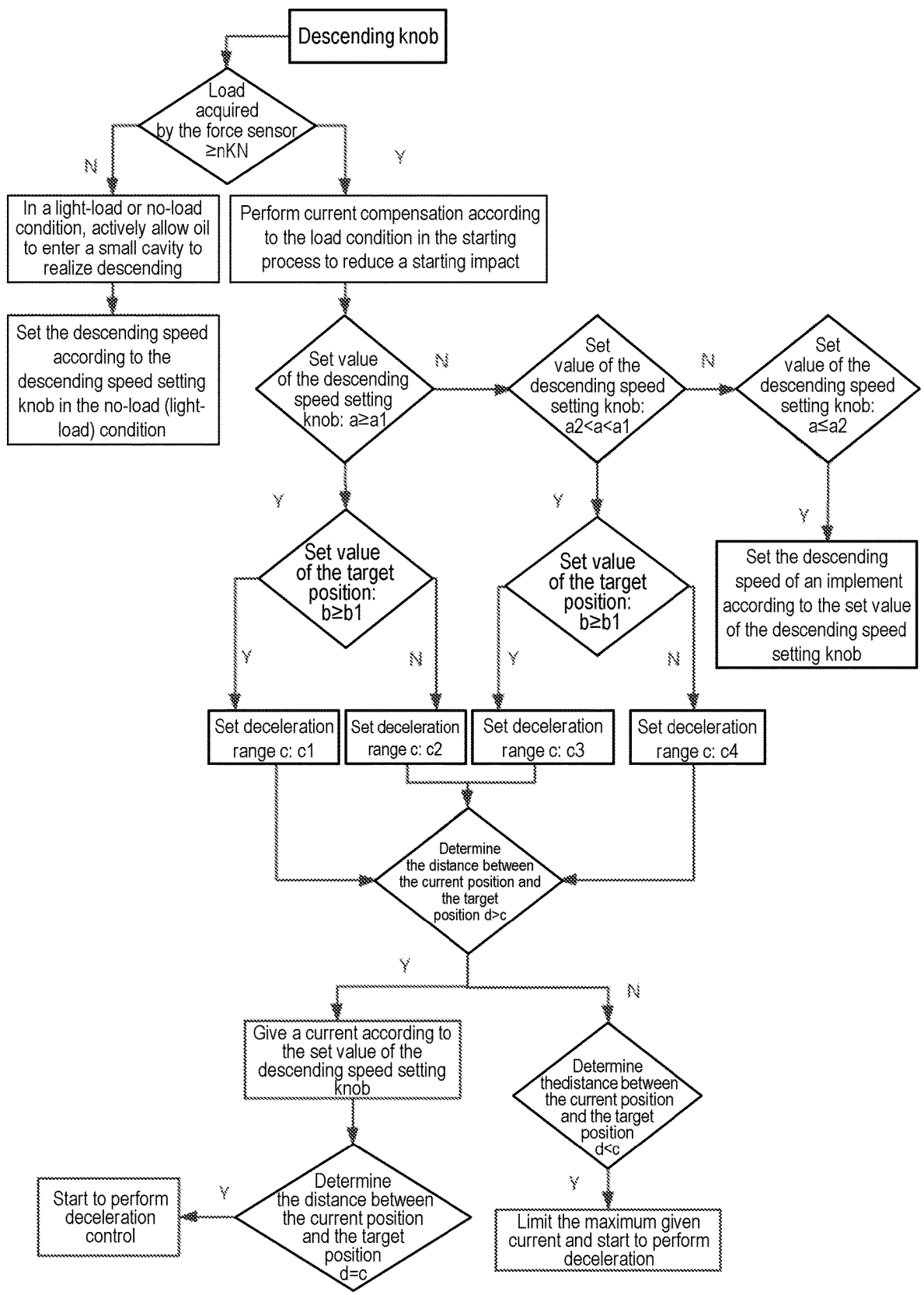
FIG. 2 is a schematic diagram of the control process of an implement descending stability control method according to an embodiment of the invention.

As shown in FIG. 1 and FIG. 2, based on the implement descending stability control system in Embodiment 1, this embodiment provides an implement descending stability control method. The implement descending stability control method adopts the implement descending stability control system in Embodiment 1, and comprises: inputting, by a descending knob, a descending instruction to a controller; reading, by the controller, load information of a suspension mechanism acquired by a force sensor and comparing the load information with a set value; when the load information of the suspension mechanism acquired by the force sensor is less than a set value, selecting a no-load or light-load mode by the controller to control an implement to descend; and when the load information of the suspension mechanism acquired by the force sensor is greater than or equal to the set value, selecting a medium-load/heavy-load mode by the controller to control the implement to descend.

When the load information of the suspension mechanism acquired by the force sensor is less than a set value, selecting a no-load or light-load mode by the controller to control an implement to descend specifically comprises: setting an implement control valve as a corresponding control object of a descending speed setting knob, and controlling the implement control valve to obtain a corresponding current Ya according to a set value of the descending speed setting knob and controlling a switching valve to be powered on, by the controller, to allow hydraulic oil output by a main pump to pass through the implement control valve and the switching valve to enter a rod cavity of a suspension cylinder and hydraulic oil in a rodless cavity of the suspension cylinder to pass through the switching valve to return to the oil tank.

When the load information of the suspension mechanism acquired by the force sensor is greater than or equal to the set value, selecting a medium-load/heavy-load mode by the controller to control the implement to descend specifically comprises: controlling, by the controller, a descending valve to act to allow hydraulic oil in the rodless cavity of the suspension cylinder to pass through the descending valve to return to the oil tank, wherein in this case, the current Yb corresponding to the set value of the descending speed setting knob is a maximum current for controlling the descending valve to move; at the start of descending, performing compensation control in the current increase process to reduce a starting impact, and giving an initial current by:

$$y = kx + e \quad (1)$$

where, y represents a current of the descending valve, k represents a coefficient of variation of current, x represent time, and e represents an initial normal current; and when the load information of the suspension mechanism acquired by the force sensor is greater than or equal to the set value, giving a new current by:

$$y_1 = k_1 kx + e \quad (2)$$

where, $y_1$ represents a current obtained after starting compensation, and $k_1$ represents a starting compensation coefficient; different load information corresponds to different compensation coefficients, and the compensation coefficient $k_1$ decreases with the increase of a load.

The controller compares the set value of the descending speed setting knob with a given speed threshold and compares a set value of a target position setting knob with a position threshold to determine a deceleration range in the descending process of an implement; and when the implement descends to a designated position based on the determined deceleration range, the descending valve works under the control of the given new current.

The specific operating process is as follows:

When an operator operates the descending knob on a panel to control the three-point suspension mechanism to descend, the force sensor 11 determines whether there is an implement or an implement load according to acquired load information of the three-point suspension mechanism.

When the load information acquired by the force sensor 11 is less than nKN, the controller 13 determines that there is no implement or there is a light implement, the implement control valve 6 is set as the corresponding control object of the descending speed setting knob 14, the controller 13 controls the implement control valve 6 to obtain the corresponding current Ya to be opened by a corresponding degree according to a set value of the descending speed setting knob and controls the switching valve 8 to be powered on to allow a left position of the switching valve 8 to act, such that hydraulic oil output by the main pump 2 passes through a left position of the implement control valve 6 and the left position of the switching valve 8 to enter the rod cavity of the suspension cylinder 9, and hydraulic oil in the rod cavity of the suspension cylinder 9 passes through the left position of the switching valve 8 to return to the oil tank. In this case, because the three-point suspension mechanism and the small implement have a small weight, a front-back pressure difference of the implement control valve 6 is approximately a constant value by means of the constant-difference overflow valve 5, and the descending speed of the suspension cylinder 9 is in positive correlation with the opening degree of the implement control valve 6, that is, the descending speed of the suspension cylinder 9 is in positive correlation with the set value of the descending speed setting knob 14.

When the load information acquired by the force sensor is greater than or equal to nKN, the controller 13 determines that the implement is a medium/heavy load and controls the descending valve 7 to act to allow hydraulic oil in the rodless cavity of the suspension cylinder 9 to pass through a left position of the descending valve 7 to return to the oil tank.

In this case, the current Yb corresponding to the set value of the descending speed setting knob 14 is the maximum current for controlling the descending valve 7 to move, and the opening degree of the descending valve 7 and a pressure difference between the inlet and the outlet of the descending valve 7 determine the descending speed. In the starting process, a starting impact will be caused due to the rapid increase of current, the descending speed will be increased, and the implement will impact the ground at a high speed without speed compensation, causing damage to the implement.

At the start of descending, compensation control needs to be performed in the current increase process to reduce the starting impact, and the initial current is given by:

$$y = kx + e \quad (1)$$

Where, y represents a current of the descending valve, k represents a coefficient of variation of current, x represent time, and e represents an initial normal current; when the load information of the suspension mechanism acquired by the force sensor is greater than or equal to the set value, a new current is given by:

$$y_1 = k_1 kx + e \quad (2)$$

Where, $y_1$ represents a current obtained after starting compensation, and $k_1$ represents a starting compensation coefficient; different load information corresponds to different compensation coefficients, and the compensation coefficient $k_1$ decreases with the increase of the load.

Further, the controller determines a set value a of the descending speed setting knob 14:

When a≥a1 (a1 is a first speed threshold), a set value b of the targe position setting knob 15 is further determined; when b≥b1 (b1 is a first position threshold), the deceleration range is set as c1, that is, the controller 13 controls the descending valve 7 to perform speed control when the implement descends to a b+c1 position (that is, the descending valve 7 works under the control of a given new current); when b<b1, the deceleration range is set as c2, that is, the controller 13 controls the descending valve 7 to perform speed control when the implement descends to a b+c2 position;

When a2<a<a1 (a2 is a second speed threshold), the set value b of the targe position setting knob 15 is further determined; when b≥b1, the deceleration range is set as c3, that is, the controller 13 controls the descending valve 7 to perform deceleration control when the implement descends to a b+c3 position; when b<b1, the deceleration range is set as c4, that is, the controller 13 controls the descending valve 7 to perform deceleration control when the implement descends to a b+c4 position;

When a≤a2, because the set value of the descending speed setting knob is small, the descending speed of the implement is set according to the set value of the descending speed setting knob, the controller 13 directly gives a corresponding current of the descending valve 7, and deceleration control is not needed.

Further, the controller 13 determines a distance d between a current position (feedback information of the position sensor 12) and a position set by the target position setting knob 15 (set by a control panel);

When d>c (c represents an initial value of the deceleration range for calculating a set value of a current speed knob and a set value of a target distance knob), that is, when the controller 13 determines that the distance between the current position of the implement and a target position exceeds the set deceleration range, the controller 13 gives a corresponding current according to the set value of the descending speed setting knob, and with the descending of the implement, the torque of the implement will be increased and the descending speed will be increased under the same opening degree, so the given current is compensated:

$$y_2 = Yb - k_2 x \quad (3)$$

Where, $y_2$ represents a current obtained after torque increase compensation, Yb represents a current corresponding to the set value of the descending speed setting knob in the medium/heavy load condition, and $k_2$ is a torque increase compensation coefficient;

Further, when d<c, that is, when the current actual position of the implement is within the preset deceleration range, the maximum current is limited at the start of descending and will not be given according to the set value of the descending speed setting knob, and the given current is limited by:

$$y_3 = k_3 Yb - k_4 x \quad (4)$$

Where, $y_3$ represents a set current within a small deceleration range, $k_3$ represents a mid-value of the small deceleration range (0.5,1), and with the decrease of the distance between the actual position and the target position, $k_3$ will decrease; $k_4$ represents a compensation coefficient of the small deceleration range, and when deceleration is started, the actual position will gradually approach the set target position, and the descending speed will decrease to 0 when $y_3$ decreases to a certain value;

Further, in the descending process of the implement, when d=c, the implement enters the deceleration range, $$y_4 = y_2 - k_5 x \quad (5)$$

Where, $y_4$ represents a set current set within a full deceleration range, and $k_5$ represents a compensation coefficient of the full deceleration range; within the full deceleration range, the current decreases approximately linearly until implement reaches the target position, and the descending speed reaches 0 when $y_4$ decreases to a certain value.

According to the invention, in case of no load or a small load, the set value of the descending speed setting knob is made to correspond to the current of the implement control valve and the constant-difference overflow valve is used to allow oil to enter the rod cavity of the cylinder to obtain a desired descending speed, and the descending speed changes linearly, thus solving the problem of a low descending speed in case of no load or a small load.

According to this embodiment, in case of a heavy load, compensation is performed at the start of descending to reduce a starting impact, thus solving the problem of starting impact; in the descending process, the implement is buffered before reaching the target position, such that the implement can be decelerated when approaching the target position and can be stopped when reaching the target position, thus reducing the stopping impact, avoiding damage to the implement and solving the problem of stopping impact; and in the descending process of a plough, compensation control is performed to avoid the acceleration of the plough caused by torque changes and to keep the speed of the plough constant, such that the speed of the plough will not be increased greatly, and the plough can be stopped stably, thus solving the problem that the plough cannot be stopped stably due to the increase of the speed.

Embodiment 3

Based on the implement descending stability control system in Embodiment 1 and the implement descending stability control method in Embodiment 2, this embodiment provides a tractor, which is provided with the implement descending stability control system in Embodiment 1 and controls an implement to descend stably based on the implement descending stability control method in Embodiment 2.

The above embodiments are merely preferred ones of the invention. It should be noted that those ordinarily skilled in the art can make some improvements and transformations without departing from the technical principle of the invention, and all these improvements and transformations should fall within the protection scope of the invention.

What is claimed is:

1. An implement descending stability control method, using an implement descending stability control system, wherein the implement descending stability control system comprises a main pump, an outlet of the main pump is communicated with an inlet of a main overflow valve, an inlet of a constant-difference overflow valve and an inlet of an implement control valve;
wherein an oil outlet of the implement control valve is connected with a spring cavity of the constant-difference overflow valve through a steady-state throttle valve and is communicated with an inlet of a switching valve;
wherein an oil outlet of the switching valve is connected with a rodless cavity of a suspension cylinder in a suspension mechanism, the rodless cavity of the suspension cylinder is communicated with an inlet of a descending valve, and a rod cavity of the suspension cylinder is connected with an inlet of a secondary overflow valve;
wherein a position sensor, a force sensor for acquiring load information of the suspension mechanism, a descending knob, a target position setting knob and a descending speed setting knob are electrically connected with an input terminal of a controller, and an output terminal of the controller is electrically connected with a solenoid valve of the implement control valve, a solenoid valve of the descending valve, and a solenoid valve of the switching valve;
the implement descending stability control method comprising:

inputting, by the descending knob, a descending instruction to the controller;
reading, by the controller, load information of the suspension mechanism acquired by the force sensor and comparing the load information with a set value;
when the load information of the suspension mechanism acquired by the force sensor is less than the set value, selecting a no-load or light-load mode by the controller to control an implement to descend; and
when the load information of the suspension mechanism acquired by the force sensor is greater than or equal to the set value, selecting a medium-load/heavy-load mode by the controller to control the implement to descend.

2. The implement descending stability control method according to claim 1, wherein when the load information of the suspension mechanism acquired by the force sensor is less than the set value, selecting a no-load or light-load mode by the controller to control an implement to descend specifically comprises:
setting the implement control valve as a corresponding control object of the descending speed setting knob, and controlling the implement control valve to obtain a corresponding current Ya according to a set value of the descending speed setting knob and controlling the switching valve to be powered on, by the controller, to allow hydraulic oil output by the main pump to pass through the implement control valve and the switching valve to enter the rod cavity of the suspension cylinder and hydraulic oil in the rodless cavity of the suspension cylinder to pass through the switching valve to return to an oil tank.

3. The implement descending stability control method according to claim 1, wherein when the load information of the suspension mechanism acquired by the force sensor is greater than or equal to the set value, selecting the medium-load/heavy-load mode by the controller to control the implement to descend specifically comprises:
controlling, by the controller, the descending valve to act to allow hydraulic oil in the rodless cavity of the suspension cylinder to pass through the descending valve to return to the oil tank, wherein in this case, a current Yb corresponding to a set value of a descending speed setting knob is a maximum current for controlling the descending valve to move;
at the start of descending, performing compensation control in a current increase process to reduce a starting impact, and giving an initial current by:

$$y = kx + e \tag{1}$$

where, y represents a current of the descending valve, k represents a coefficient of variation of current, x represent time, and e represents an initial normal current;
when the load information of the suspension mechanism acquired by the force sensor is greater than or equal to the set value, giving a new current by:

$$y1 = k1kx + e \tag{2}$$

where, y1 represents a current obtained after starting compensation, and k1 represents a starting compensation coefficient; different load information corresponds to different compensation coefficients, and the compensation coefficient k1 decreases with the increase of a load.

4. The implement descending stability control method according to claim 3, wherein the controller compares the set value of the descending speed setting knob with a given speed threshold and compares a set value of a target position setting knob with a position threshold to determine a deceleration range in the descending process of an implement; and when the implement descends to a designated position based on the determined deceleration range, the descending valve works under the control of the given new current.

5. A tractor, wherein the tractor is provided with the implement descending stability control system according to claim 1.

6. The implement descending stability control method according to claim 1, wherein the force sensor is a pin-type tension/pressure sensor at a lower hinge point of a lower link of the suspension mechanism and a tractor body.

7. The implement descending stability control method according to claim 1, wherein the force sensor is a pressure sensor mounted in the rodless cavity of the suspension cylinder.

8. The implement descending stability control method according to claim 1, wherein the position sensor is an angle sensor fixed on a lifting shaft.

9. The implement descending stability control method according to claim 1, wherein the position sensor is a displacement sensor for detecting a piston stroke of the suspension cylinder.

* * * * *